UNITED STATES PATENT OFFICE.

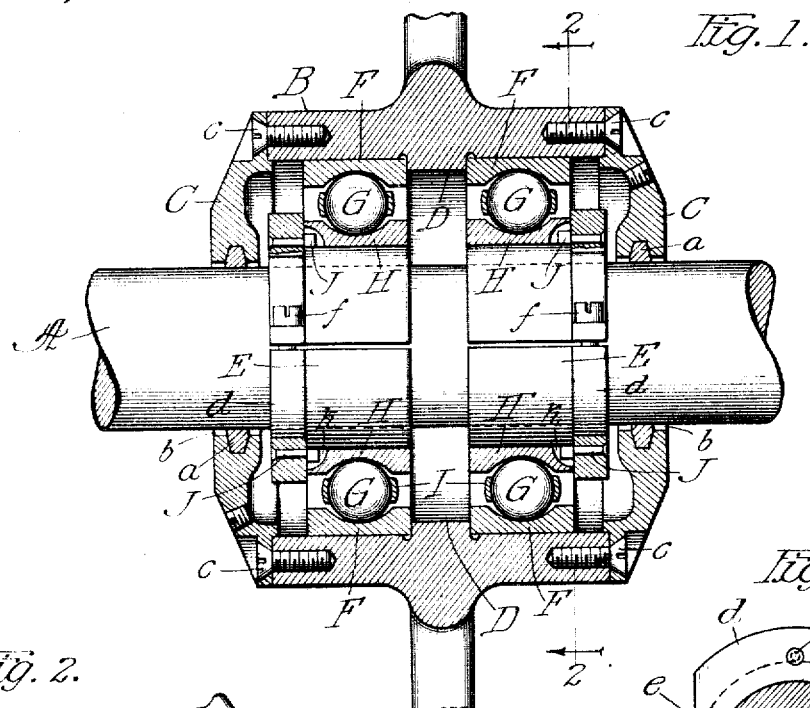
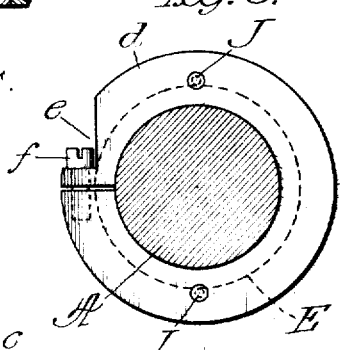
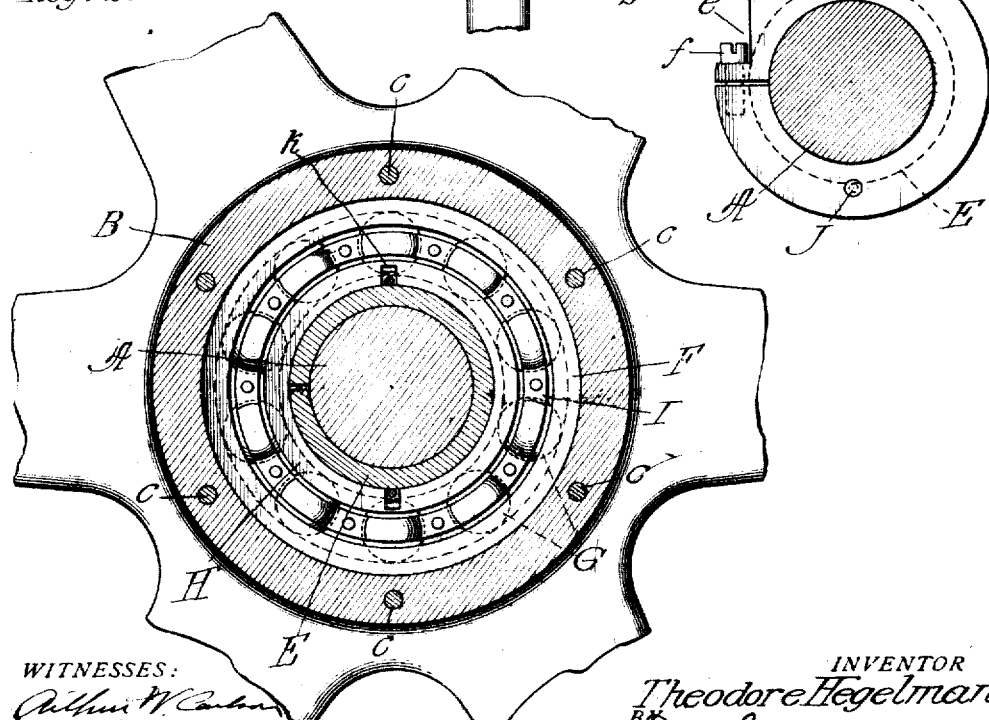

THEODORE HEGELMAN, OF OAK PARK, ILLINOIS.

BALL-BEARING.

1,336,352.   Specification of Letters Patent.   Patented Apr. 6, 1920.

Application filed February 17, 1919. Serial No. 277,475.

*To all whom it may concern:*

Be it known that I, THEODORE HEGELMAN, a subject of the German Empire, (who has declared his intention of becoming and has made application for citizenship in the United States,) residing at Oak Park, in the county of Cook and State of Illinois, have invented new and useful Improvements in Ball-Bearings, of which the following is a full, clear, and exact description.

My invention relates to improvements in ball-bearings, and particularly to the bearings of loose pulleys and transmission shafts.

An object of my invention is to so construct such ball-bearing that all the parts thereof are standard parts and, when any of said parts become damaged, can be removed and replaced without affecting the other parts. Another object is to enable such parts to be made in an economical manner and to be easily and quickly assembled or disassembled. This I accomplish by the means hereinafter described, and as particularly pointed out in the claims.

In the drawings:

Figure 1 is a longitudinal section of the boss of a wheel showing the application thereto of my improved ball bearing.

Fig. 2 is a transverse section of the same taken on dotted line 2—2, Fig. 1.

Fig. 3 shows an end view of one of the sleeves and a transverse section of the shaft to which the same is clamped.

Referring to the drawings, A represents a shaft and B the hollow circumferential shell of the boss of a loose pulley. In the event of my improvements being used for shaft bearings the shell of the casing would be constructed just the same as said boss minus the arms radiating therefrom and plus some means for attaching the same in a stationary position to a suitable support.

The ends of shell B are closed by suitable heads C, C, that are secured thereto by countersunk screws c, c, and are provided with central openings b, b, through which shaft A extends, and with suitable packing a, a, in such openings.

At its center of length the interior of shell A is provided with an integral circumferential rib D, the transverse sides of which are, preferably, disposed at right angles to the axis of the shaft. Between heads C, C, and the central portion of the interior of the casing, shaft A has corresponding sleeves E, E, mounted thereon that are split longitudinally on one side, and when assembling the parts of the bearing, they are slipped longitudinally over the ends of said shaft and pushed lengthwise thereon into place. The ends of such sleeves nearest heads C, C, are provided with circumferential flanges d, d, that have niches e, e, cut in their circumferences on one side of the split to permit screws f, f, to be screwed in a tangential direction to draw the split edges of the sleeve together and securely clamp the same on the shaft against longitudinal movement.

The outer races F of my improvement consists of a flat metal ring, the outer circumference of which corresponds to the inner circumference of casing B within which it is placed, and the inner circumference of which has the usual circumferential groove therein in which the bearing-balls G, G, travel. The inner races H, H, also consist of flat metal rings of the same transverse dimensions as the outer races and the diameter of the inner circumference of these inner races correspond to that of the outer circumference of sleeve E, and their width, preferably, corresponds to the distance between flanges d, d, of sleeves E and the opposite ends thereof.

The races and circular cages I in which the bearing balls are retained are made in semi-circular sections and are mounted upon said sleeves between the flanges and the opposite ends of the same and are shoved into the casing therewith at the same time and until they come in contact with rib D.

The inner races are, preferably, prevented from revolving upon sleeves E by means of pins J, J, which latter are inserted through suitable longitudinal openings in flanges d and have their heads enter suitable recesses h, h, in the side edges of the rings, and their outer ends swaged, as shown. When all the parts of my improved ball-bearing are properly assembled, the inner races are held against flanges d of the sleeve by the contact of the outer races with the rib, and the outer races are held against the rib by the contact of the inner races against the flanges. The inner and outer races with the bearing-balls between them, fill the space between the sleeves and the inner circumference of the casing, and are locked in this position simply by clamping the sleeves in position.

If it is desired to remove and replace any of the parts of my improved bearing, all that it is necessary to do is to remove the nearest head C and loosen screws *f, f,* of the sleeve nearest the same and then slide said sleeve out of the casing until the races and bearing-balls can be removed therefrom. The part to be replaced is then properly mounted on sleeve E again and the latter shoved back into the casing and clamped on the shaft again by tightening screws *f, f*.

What I claim as new is:

1. The combination with a shaft, a sleeve mounted thereon and an inner race mounted and retained on said sleeve, of an outer race, bearing-balls interposed between said races, a casing through which said shaft extends having a circumferential rib projecting from its inner circumference, and means for keeping said outer race bearing against said rib.

2. The combination with a shaft, two sleeves mounted thereon, and an inner race mounted and retained on each sleeve, of an outer race concentric with each inner race, bearing-balls interposed between said inner and outer races, a casing through which said shaft extends having a circumferential rib mediate its ends, and means for keeping said outer races in contact with said rib.

3. The combination with a shaft, two sleeves mounted thereon that have their outer ends flanged, and inner races mounted and retained on each sleeve in contact with its flanged end, of an outer race concentric with each inner race, bearing-balls interposed between said inner and outer races, and a casing through which said shaft extends having a circumferential rib mediate its ends with which said outer races are in contact.

4. The combination with a shaft, two separated sleeves mounted and retained against longitudinal movement thereon, that have flanges on their outer ends, and an inner race mounted and retained against independent longitudinal movement on each sleeve, of a casing through which said shaft extends, separated outer races placed against the inner circumference of said casing, and means for preventing said outer races from moving toward each other.

5. The combination with a shaft, two separated sleeves mounted and retained against longitudinal movement thereon that have flanges on their outer ends, and an inner race mounted and retained against independent longitudinal movement on each sleeve, of a casing through which said shaft extends, separated outer races placed against the inner circumference of said casing, and means integral with said casing for preventing said outer races from moving toward each other.

6. The combination with a shaft, two separated sleeves mounted and retained against longitudinal movement thereon that have flanges on their outer ends, and an inner race mounted and retained against independent longitudinal movement on each sleeve, of a casing through which said shaft extends, separated outer races placed against the inner circumference of said casing, and means interposed between said outer races to prevent them from moving toward each other.

7. The combination with a shaft, a sleeve mounted thereon having its outer end flanged, an inner race mounted and retained on said sleeve in contact with said flange, and a pin extending through said flange and having its inner end enter a niche in the adjacent edge of said inner race, of an outer race, bearing-balls interposed between said inner and outer races, a casing through which said shaft extends, and means engaged by said outer race to prevent it moving longitudinally.

In witness whereof I have hereunto set my hand this 18th day of January, 1919.

THEODORE HEGELMAN.

Witnesses:
FRANK D. THOMASON,
EVA STREIT.